(No Model.)
2 Sheets—Sheet 1.

D. A. FYFE.

PREPARING AND PRESERVING BALED HAY, STRAW, &c.

No. 537,570.
Patented Apr. 16, 1895.

Witnesses
B. W. Miller
Guy E. Davis

Inventor
David A. Fyfe,
By his Attorneys,
Baldwin Davidson & Wight (No Model.) 2 Sheets—Sheet 2.
D. A. FYFE.
PREPARING AND PRESERVING BALED HAY, STRAW, &c.

No. 537,570. Patented Apr. 16, 1895.

United States Patent Office.

DAVID ADAM FYFE, OF STRATFORD, ENGLAND.

PREPARING AND PRESERVING BALED HAY, STRAW, &c.

SPECIFICATION forming part of Letters Patent No. 537,570, dated April 16, 1895.

Application filed July 6, 1894. Serial No. 516,748. (No specimens.)

*To all whom it may concern:*

Be it known that I, DAVID ADAM FYFE, a subject of the Queen of Great Britain, residing at Victoria Mills, Wharf Road, Stratford, Essex, England, have invented certain new and useful Improvements in Processes of Treating Hay, Clover, &c., of which the following is a specification.

The object of my invention is to treat or cook hay, clover, &c., in bales or trusses, in an effective, expeditious, and simple manner, so that it may at once be used for food for animals; which ends I attain by inclosing the material to be treated in a strong, close, heated vessel, creating a partial vacuum in said vessel, admitting high-pressure steam into the vessel, and allowing it to remain there a sufficient length of time to thoroughly permeate and cook the material contained therein; then cutting off the steam, and creating a partial vacuum in the vessel, in order to dry the hot, moist material preparatory to its removal from the cooking vessel.

Figure 1:
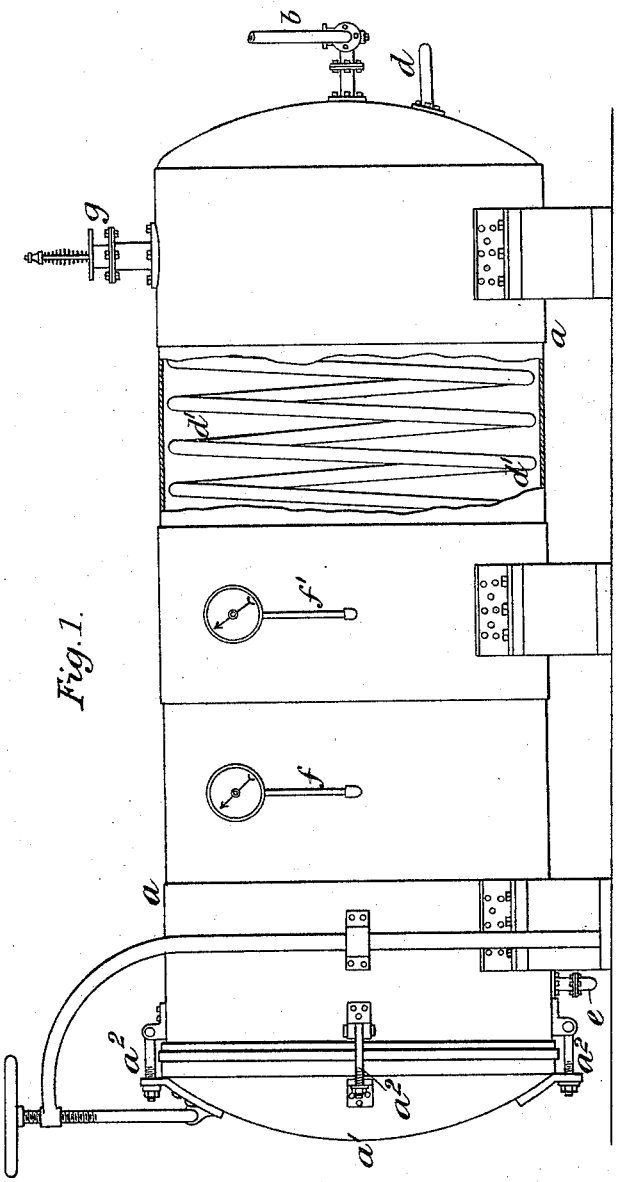
Figure 2:
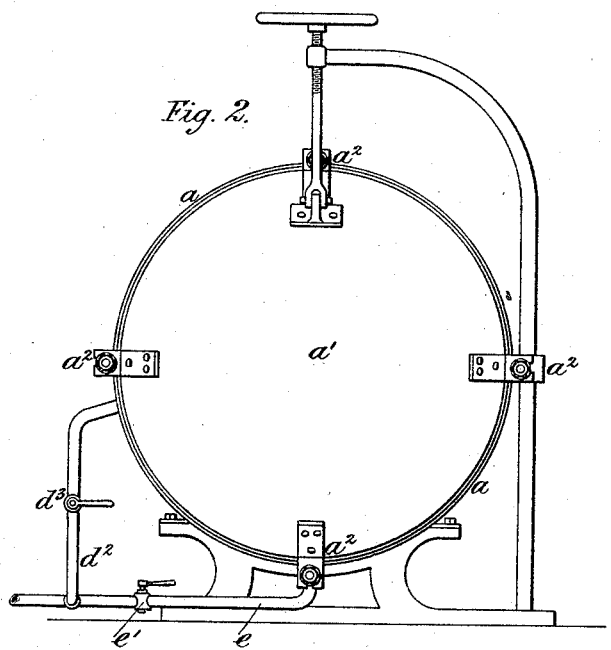
Figure 3:
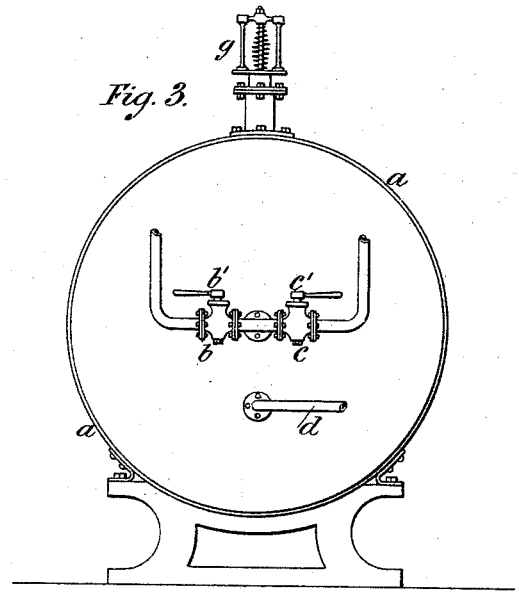

In the accompanying drawings which show one convenient form of apparatus for practicing my invention Figure 1 represents a side elevation with part of the casing broken away to show the interior; Fig. 2, an elevation of the front or feed-end, and Fig. 3, a corresponding view of the opposite end.

An iron or steel cylinder or vessel $a$, has a removable cover, end, or head $a'$, secured to the cylinder by a series of screw bolts $a^2$, hinged to the cylinder, and engaging lugs upon the cover. The cover is suspended from a crane mounted upon the cylinder, so as to admit of the ready removal or replacement of the cover, when unbolted. When in position, the cover fits steam-tight upon the cylinder. High-pressure steam is admitted to the cylinder at proper periods through a pipe $b$, provided with a cock $b'$, at its rear end. An exhaust-pipe $c$, provided with a suitable cock $c'$, connects the cylinder with a suitable exhaust-apparatus, such as an air-pump worked by a suitable motor.

The steam-boiler and exhaust apparatus being of well known construction, are not shown.

A steam-pipe $d$, entering the rear head of the cylinder, connects with a heater-coil $d'$, therein, terminating at its forward end in a discharge-pipe $d^2$, provided with a cock $d^3$, and connecting with a blow-off pipe $e$, provided with a cock $e'$. One end of this blow-off pipe enters the interior of the cylinder, and the other leads to a suitable place of discharge. The cylinder should be slightly inclined, so that any water deposited in it may escape through this outlet pipe-$e$.

The cylinder is provided with a suitable pressure-gage $f$, a vacuum gage $f'$, and a safety valve $g$, which latter preferably should be set to blow off at a pressure of about sixty pounds to the square inch, this being a suitable working pressure.

The operation is as follows: The bale or truss to be treated is inserted in the cylinder, and the cover tightly secured thereon. Steam is then allowed to flow through the coil $d'$, until the vessel and its contents are well heated. The air and moisture are then exhausted from the cylinder, so as to create a vacuum or partial vacuum therein. When the cylinder and its contents are hot enough to avoid undue condensation, the exhaust-cock $c'$ is closed, and high-pressure steam admitted into the vessel through the cock $b'$, to cook the material. The blow-off cock $e'$ is to be opened from time to time during the cooking to allow any water of condensation to escape. A comparatively short period only is required for the high-pressure steam to thoroughly permeate and cook the material, a good result being obtained by a half an hour to one hour's steaming, at a pressure of sixty pounds to the square inch. When the cooking is completed, the supply of steam is shut off and that already in the vessel blown off. The outlet for steam is then closed, and a partial vacuum again produced in the vessel rapidly to exhaust the moisture from the fodder, which is quickly dried by the heat of the cylinder, removed therefrom and allowed to cool. The dry and cool material is ready to be cut up for use without further treatment, as soon as removed from the treating vessel.

Hay, as it comes from the field, even when damaged or wet, may be pressed into bales, or trusses and advantageously treated as above described.

It will be observed that there are several important and advantageous steps in my improved process: First, by the use of high-pressure steam, in a closed vessel, I am enabled to apply a temperature sufficient to rapidly cook the material; second, by heating the cooking vessel, undue condensation of the steam is prevented; third, by preliminarily exhausting air from the cylinder the penetration of the material by the steam is facilitated; fourth, by exhausting the cylinder, after the steaming is completed, the heat is utilized to evaporate the moisture from the material treated, and it is delivered sufficiently dried for immediate use.

I am aware that it is old to disinfect articles by subjecting them to the action of steam in a close heated vessel, and in a partial vacuum, and subsequently to evaporate the moisture therefrom by exhausting the vessel; but such operation produces no change in the condition of the article treated, whereas my invention results in the creation of a palatable and nutritious article of food for animals.

By my process, the following changes are effected in the hay: (a) a portion of the albuminoids are rendered more soluble; (b) the saccharine principles are increased; (c) the soluble and digestible carbo-hydrates are increased; (d) the indigestible fiber is diminished; (e) the chlorophyll matters undergo a change; (f) the oxidizable substances are increased; (g) the color, odor, and taste are changed, both of the fodder itself and of its infusions; (h) the amount of moisture in the fodder is reduced; (i) there is a mechanical change, by which the fodder becomes more easily disintegrated; (j) the action of ferments is arrested. These changes render fodders fragrant and palatable, more attractive and digestible by cattle.

When sour hay is submitted to my process, the disagreeable odor and taste are removed, and a pleasant fragrance and taste are developed.

When crude, unfinished hay is submitted to my process, it is immediately converted into finished and ripened hay and suitable for stall and market.

Crude, unfinished hay is liable to heat, which often results in spontaneous combustion. Such hay, after treatment by my process may be safely stored, and does not deteriorate even if the storage be somewhat prolonged.

Analyses of hay untreated and also treated according to my process show the following:

|  | Untreated parts. | Treated parts. |
|---|---|---|
| Moisture | 12.0 | 7.1 |
| Albuminoids | 8.1 | 8.5 |
| Digestible fiber and carbo-hydrates | 37.3 | 53.3 |
| Indigestible woody fiber | 37.2 | 25.8 |
| Ash | 5.4 | 5.3 |
|  | 100.0 | 100.0 |

I claim as my invention—

1. The hereinbefore described process of treating hay, clover and the like in bales or trusses, which process comprises the following steps;—first, inclosing the material to be treated in a vessel adapted to be closed and heated; second, creating a vacuum or partial vacuum therein; third, admitting high pressure steam to the vessel, and causing it to permeate and cook the material, and fourth, exhausting the vessel to dry and cool the cooked material.

2. The process herein described, which consists in heating a closed vessel, placing therein a bale or truss of hay, clover or similar material, exhausting the air and moisture from the vessel to create a vacuum or partial vacuum therein, then admitting high pressure steam to the vessel and causing it to permeate and cook the material to reduce the indigestible woody fiber and increase the digestible fibers and carbo-hydrates, then shutting off the steam, exhausting it from the vessel and producing a partial vacuum in the vessel to rapidly exhaust the moisture from the material and dry it, substantially as set forth.

DAVID ADAM FYFE.

Witnesses:
HENRY WM. GIBBS,
RICHARD DRAKE.